US011359716B2

(12) United States Patent
Takahashi et al.

(10) Patent No.: US 11,359,716 B2
(45) Date of Patent: Jun. 14, 2022

(54) DRIVE DEVICE FOR VEHICLES

(71) Applicant: AISIN CORPORATION, Kariya (JP)

(72) Inventors: Ryohei Takahashi, Aichi (JP); Jun Takamatsu, Aichi (JP); Toshihiro Okada, Aichi (JP)

(73) Assignee: AISIN CORPORATION, Kariya (JP)

( * ) Notice: Subject to any disclaimer, the term of this patent is extended or adjusted under 35 U.S.C. 154(b) by 229 days.

(21) Appl. No.: 16/637,332

(22) PCT Filed: Sep. 19, 2018

(86) PCT No.: PCT/JP2018/034694
§ 371 (c)(1),
(2) Date: Feb. 7, 2020

(87) PCT Pub. No.: WO2019/065423
PCT Pub. Date: Apr. 4, 2019

(65) Prior Publication Data
US 2021/0362592 A1 Nov. 25, 2021

(30) Foreign Application Priority Data
Sep. 29, 2017 (JP) .............................. JP2017-191977

(51) Int. Cl.
*F16H 57/02* (2012.01)
*F16H 61/00* (2006.01)
(52) U.S. Cl.
CPC ......... *F16H 61/0003* (2013.01); *F16H 57/02* (2013.01); *F16H 2057/02043* (2013.01)

(58) Field of Classification Search
CPC ..................... F16H 57/02; F16H 57/04; F16H 2057/02043; F16H 61/0003; F16H 61/0006
See application file for complete search history.

(56) References Cited

U.S. PATENT DOCUMENTS 5,136,998 A * 8/1992 Deutsch .............. B60R 16/0239
123/406.4
8,276,694 B2 * 10/2012 Stervik .................... B60K 6/48
180/65.22
(Continued)

FOREIGN PATENT DOCUMENTS

JP 02-3740 A 1/1990
JP 05-70023 B2 10/1993
(Continued)

OTHER PUBLICATIONS

Machine translation of JP 2-3740 A obtained on Nov. 16, 2021.*
(Continued)

*Primary Examiner* — Adam D Rogers
(74) *Attorney, Agent, or Firm* — Sughrue Mion, PLLC

(57) ABSTRACT

A drive device for vehicles includes a transmission device including a transmission mechanism that changes a speed of inputted rotation of a drive source of a vehicle and outputs the rotation and that is provided on an axis of rotation orthogonal to a front-rear direction of the vehicle; and a casing that holds the transmission mechanism; and a control device that performs electronic control of the transmission device, at least a part of the control device being installed on an outside of the casing, and the control device is installed at either one of a front side portion and a rear side portion of the casing in the front-rear direction of the vehicle.

11 Claims, 6 Drawing Sheets

(56) References Cited

U.S. PATENT DOCUMENTS

| | | | | |
|---|---|---|---|---|
| 8,488,324 | B2* | 7/2013 | Becker | H05K 7/205 |
| | | | | 361/715 |
| 9,699,929 | B2* | 7/2017 | Loi | H05K 5/0082 |
| 10,527,160 | B2* | 1/2020 | Yokota | F16H 61/0006 |
| 2011/0118070 | A1* | 5/2011 | Purretat | H02K 5/225 |
| | | | | 475/5 |
| 2012/0031215 | A1* | 2/2012 | Feier | F16H 61/0006 |
| | | | | 74/473.12 |
| 2014/0222266 | A1* | 8/2014 | Kim | B60W 20/50 |
| | | | | 701/22 |
| 2018/0283533 | A1* | 10/2018 | Omoto | F16H 61/0006 |
| 2019/0017590 | A1* | 1/2019 | Kidokoro | F16K 27/04 |

FOREIGN PATENT DOCUMENTS

| | | | |
|---|---|---|---|
| JP | H0953706 A | * | 2/1997 |
| JP | 10-238344 A | | 9/1998 |
| JP | 2003287113 A | * | 10/2003 |
| JP | 2016-205590 A | | 12/2016 |

OTHER PUBLICATIONS

Machine translation of JP 2016-205590 A obtained on Nov. 16, 2021.*
Machine translation of JP 10-238344 A obtained on Nov. 16, 2021.*
International Search Report of PCT/JP2018/034694 dated Nov. 27, 2018.

* cited by examiner

DRIVE DEVICE FOR VEHICLES

CROSS REFERENCE TO RELATED APPLICATIONS

This application is a National Stage of International Application No. PCT/JP2018/034694 filed Sep. 19, 2018, claiming priority based on Japanese Patent Application No. 2017-191977 filed Sep. 29, 2017 the disclosure of which is incorporated herein by reference in its entirety.

TECHNICAL FIELD

The present disclosure relates to a drive device for vehicles which is mounted on, for example, vehicles.

BACKGROUND ART

Conventionally, vehicles on which, for example, an automatic transmission is mounted as a drive device for vehicles are widely spread. For this type of vehicle, there is known one in which a control device for an automatic transmission is installed on an outside of the automatic transmission (see Patent Literature 1). This control device eliminates the need for a harness between the control device and the automatic transmission by directly connecting a connector of the control device to a connector of the automatic transmission. In addition, by allowing first positioning marks provided on the control device to align with the positions of second positioning marks provided on the automatic transmission, connecting work between the connectors is facilitated.

CITATIONS LIST

Patent Literature

Patent Literature 1: JP 2016-205590 A

SUMMARY OF DISCLOSURE

Technical Problems

However, for the control device described in the above-described Patent Literature 1, there is no disclosure of in which location on the automatic transmission the control device is installed. Depending on the location where the control device is installed, there is a possibility of hit of bouncing rocks or adhesion of water onto the control device or overheating of the control device. In these cases, there is a concern that the durability of the control device installed on the outside of the automatic transmission decreases.

In view of this, the present disclosure provides a drive device for vehicles that inhibits hit of bouncing rocks and adhesion of water onto a control device which is installed on an outside of a transmission device and overheating of the control device, and can thereby excellently secure the durability of the control device.

Solutions To Problems

A drive device for vehicles according to the present disclosure includes: a transmission device including a transmission mechanism that changes a speed of inputted rotation of a drive source of a vehicle and outputs the rotation and that is provided on an axis of rotation orthogonal to a front-rear direction of the vehicle; and a casing that holds the transmission mechanism; and a control device that performs electronic control of the transmission device, at least a part of the control device being installed on an outside of the casing, and the control device is installed at either one of a front side portion and a rear side portion of the casing in the front-rear direction of the vehicle.

Various Effects of Disclosure

According to the drive device for vehicles, the control device is installed at either one of the front side portion and rear side portion of the casing in the front-rear direction of the vehicle, and thus, for example, compared to a case in which the control device is installed at an underside portion of the casing, it becomes difficult for bouncing rocks and water from a road surface to reach the control device. Furthermore, when the control device is installed at the front side portion, the amount of wind blowing onto the control device from the front of the vehicle increases, enabling to excellently cool the control device, or when the control device is installed at the rear side portion, a location where the control device is installed is on a vehicle interior side, and thus, the amount of heat received from a radiator, etc., disposed on a vehicle's front side is further reduced. By this, hit of bouncing rocks and adhesion of water onto the control device which is installed on the outside of the transmission device and overheating of the control device are inhibited, enabling to excellently secure the durability of the control device. Other features and advantages of the present disclosure will become apparent from the following description made with reference to accompanying drawings. Note that in the accompanying drawings, the same or similar configurations are given the same reference signs.

DESCRIPTION OF EMBODIMENTS

First Embodiment

Figure 1:
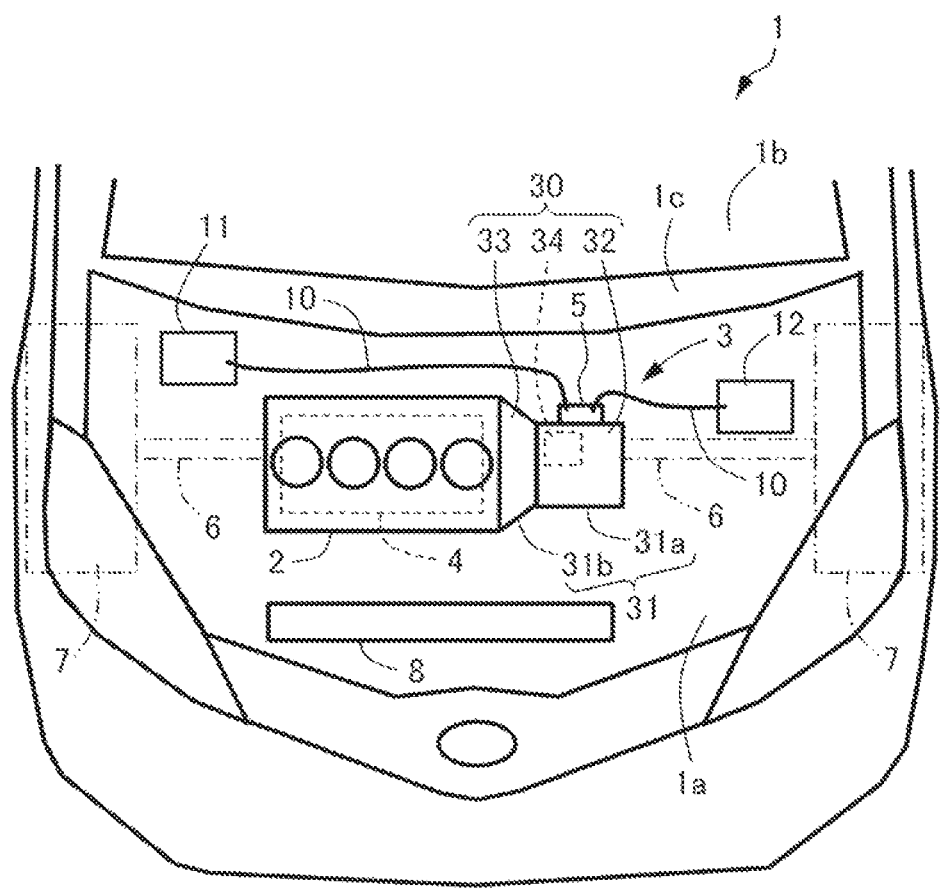
FIG. 1 is a schematic diagram showing a vehicle on which a drive device for vehicles according to a first embodiment is mounted.
Figure 1:
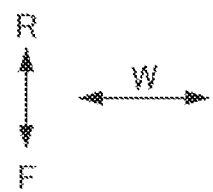

A first embodiment of a drive device for vehicles will be described below with reference to FIGS. 1 to 5. First, a schematic configuration of a vehicle 1 on which an automatic transmission 3 is mounted as an example of a drive device for vehicles will be described along FIG. 1. As shown in FIG. 1, the vehicle 1 of the present embodiment includes, for example, an internal combustion engine 2, the automatic transmission 3, drive shafts (axles) 6, wheels 7, and a radiator 8. The internal combustion engine 2 is an internal combustion engine, e.g., a gasoline engine or a diesel engine, and is coupled to the automatic transmission 3. In addition, in the present embodiment, the automatic transmission 3 is of a so-called front-engine/front-drive (FF) type. Note, however, that the automatic transmission 3 is not limited to the FF type and may be of a rear-engine/rear-drive (RR) type. In addition, although in the present embodiment, as an example of a vehicle to which the drive device for vehicles is applied, a case of a vehicle that uses only the internal combustion engine 2 as a drive source is described, the configuration is not limited thereto, and the drive device for vehicles may be applied to a hybrid vehicle that uses, for example, an internal combustion engine and an electric motor as drive sources.

The automatic transmission 3 is mounted on an engine room 1a of the vehicle 1, and includes a transmission device 30 that changes the speed of inputted rotation of the internal combustion engine 2 and outputs the rotation; and a hydraulic control device 4 and an ECU (control device) 5 that control the transmission device 30. The transmission device 30 includes a transmission mechanism 32, a torque converter (hydraulic power transmission mechanism) 33, a differential device 34, and a transmission case 31 that holds these components. The torque converter 33 is interposed between the internal combustion engine 2 and the transmission mechanism 32, and can transmit drive power of the internal combustion engine 2 to the transmission mechanism 32 through a working fluid. The transmission case 31 includes a casing 31a that holds the transmission mechanism 32; and a holding case 31b that holds the torque converter 33. The casing 31a includes a flange part 36 for fastening the casing 31a to the holding case 31b with a bolt (fastening member) 35, the flange part 36 extending in a radial direction (see FIG. 3). The casing 31a and the holding case 31b are attached together by screwing with the bolt 35.

The transmission mechanism 32 has a belt-driven continuously variable automatic transmission mechanism (CVT) mounted thereon, and is thereby a continuously variable transmission mechanism that can steplessly change a gear ratio. Note, however, that the transmission mechanism 32 is not limited to having mounted thereon a continuously variable transmission mechanism like a CVT, and may have a stepped transmission mounted thereon. The transmission mechanism 32 is provided on the axis of rotation orthogonal to a front-rear direction of the vehicle 1. In the present embodiment, the axis of rotation is along a width direction (left-right direction) W. The differential device 34 can absorb a rotational speed difference between the left and right drive shafts 6 of the vehicle 1. The drive shafts 6 connect the differential device 34 to the wheels 7, and transmit an output from the transmission mechanism 32 to the wheels 7.

The radiator 8 is connected to a downstream side of a water jacket (not shown) of the internal combustion engine 2, and is disposed on a front direction F side of the internal combustion engine 2. The radiator 8 performs heat exchange between cooling water that circulates through the water jacket and cools the internal combustion engine 2, and outside air, and thereby cools the cooling water.

The hydraulic control device 4 includes, for example, valve body and a solenoid valve, and generates line pressure, modulator pressure, etc., from hydraulic pressure supplied from an oil pump (not shown) and drives the solenoid valve based on a control signal from the ECU 5, and can thereby supply and discharge hydraulic pressure for controlling each of the CVT, forward-reverse switching mechanism, actuator, etc., of the transmission mechanism 32.

The ECU 5 includes, for example, a CPU, a ROM that stores a processing program, a RAM that temporarily stores data, input and output ports, and a communication port, and performs electronic control of the transmission device 30 by outputting various signals such as a control signal for the hydraulic control device 4 from the output port. The ECU 5 is connected to, for example, an engine ECU (a control device for the drive source) 11 and a higher-level ECU (a control device for the vehicle) 12 through cables 10. In addition, a solenoid valve which is not shown is connected to the ECU 5 through a connector terminal 53 and a cable 10, and the solenoid valve is drive-controlled in response to input of a signal from the ECU 5. When the solenoid valve is provided, for example, in the hydraulic control device 4, the solenoid valve can output supplied hydraulic pressure as control hydraulic pressure obtained based on an inputted drive signal.

Figure 2A:
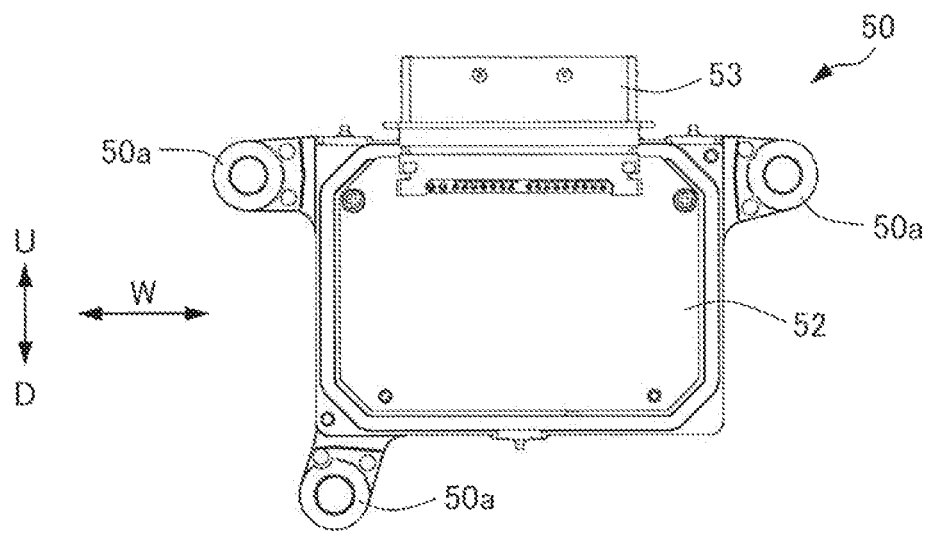
FIG. 2A is a plan view of a case and a control board showing a control device for the drive device for vehicles according to the first embodiment.

Next, the configuration and installation structure of the above-described ECU 5 will be described in detail along FIGS. 2A to 5. As shown in FIG. 2C, the ECU 5 includes a case 50 and a cover 51 placed on the case 50, and a control board 52 is held inside the case 50 and the cover 51 (see FIGS. 2A and 5). As shown in FIGS. 2A and 5, the case 50 is made of metal, and in the present embodiment the case 50 is made of die-cast aluminum. Screw hole parts 50a for screwing to the transmission case 31 are provided at both side portions in the width direction W and an edge portion in a down direction D of the case 50. The control board 52 is screwed inside the case 50. As shown in FIGS. 2A and 2C, the control board 52 includes the connector terminal 53 at its edge portion in an up direction U. The connector terminal 53 is provided so as to protrude from the case 50 of the ECU 5 in the outward up direction U, and is electrically connected to the higher-level ECU 12 or engine ECU 11 of the vehicle 1. Note that for a disposition location of the ECU 5, it is preferable, for example, that the ECU 5 be disposed near the engine ECU 11 or the higher-level ECU 12 because the cable 10 can be shortened.

Figure 2B:
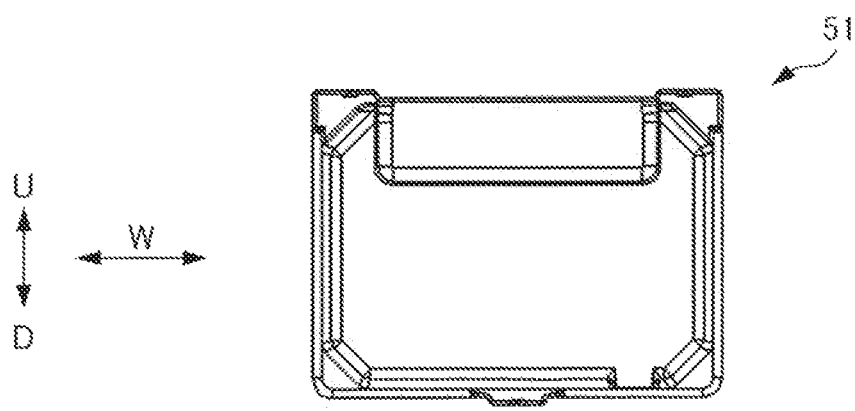
FIG. 2B is a plan view of a cover showing the control device for the drive device for vehicles according to the first embodiment.
Figure 2C:
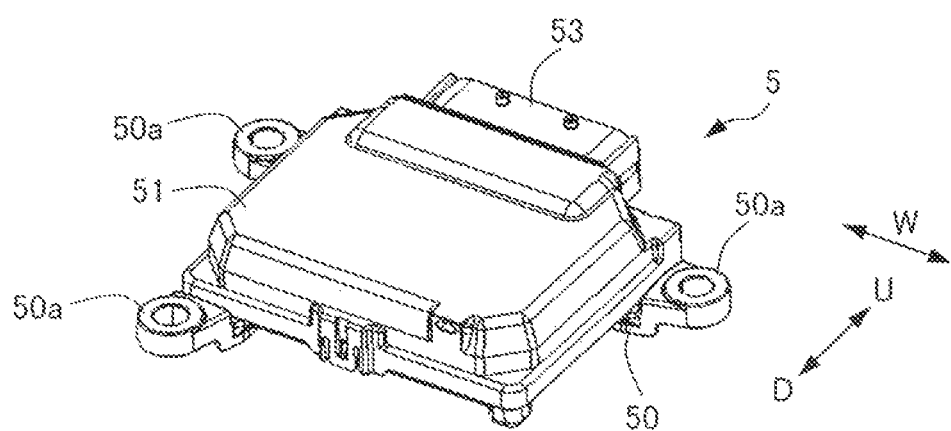
FIG. 2C is an overall perspective view showing the control device for the drive device for vehicles according to the first embodiment.

As shown in FIG. 2B, the cover 51 is made of resin, and in the present embodiment the cover 51 is made of polybutylene terephthalate (PBT). In addition, breather holes which are not shown are made in the cover 51. As shown in FIGS. 2C and 5, the cover 51 is placed on one side of the case 50, and by the placement the control board 52 is held. The connector terminal 53 is provided so as to protrude from a top side of the ECU 5 in the outward up direction U. Note that the connector terminal 53 is, for example, as shown in FIG. 1, connected to the hydraulic control device 4, the engine ECU 11, etc. By the connector terminal 53 provided so as to protrude from the ECU 5 in the outward up direction U, upon placing a cable on the connector terminal 53, work can be done from the upper side, enabling to improve workability. Note that although in the present embodiment the connector terminal 53 is provided so as to protrude from the top side of the ECU 5 in the up direction U, the configuration is not limited thereto, and the connector terminal 53 may be provided so as to protrude from a side or front/rear side of the ECU 5 in the up direction U.

As shown in FIG. 5, a heating element 56 such as an IC is mounted on the control board 52. The control board 52 is in contact with and supported by the case 50 made of metal, and can thereby dissipate heat to the case 50. In addition, in the present embodiment, a portion of a back side of the control board 52 corresponding to a location where the heating element 56 is provided abuts on and is supported by an end surface of a supporting protrusion 50b of the case 50 with a heat-dissipating material 57 therebetween. Namely, the heat-dissipating material 57 is interposed between the control board 52 and the case 50, and is located on the opposite side of the control board 52 from the heating element 56. Note that both the abutment of the control board 52 on the heat-dissipating material 57 and the abutment of the heat-dissipating material 57 on the supporting protrusion 50b of the case 50 may be direct abutment or indirect abutment. The thickness of the heat-dissipating material 57 is, for example, on the order of 0.3 mm. In addition, as the heat-dissipating material 57 used here, for example, a thermally conductive sheet is applied. For materials of the thermally conductive sheet, for example, aluminum nitride, heat dissipation silicone, non-silicone acrylic-based thermally conductive (heat-dissipating) resin, etc., can be applied. Note, however, that the heat-dissipating material 57 is not limited to a thermally conductive sheet and, for example, thermally conductive grease, a thermally conductive adhesive, heat-dissipating rubber, etc., can be applied.

Figure 3:
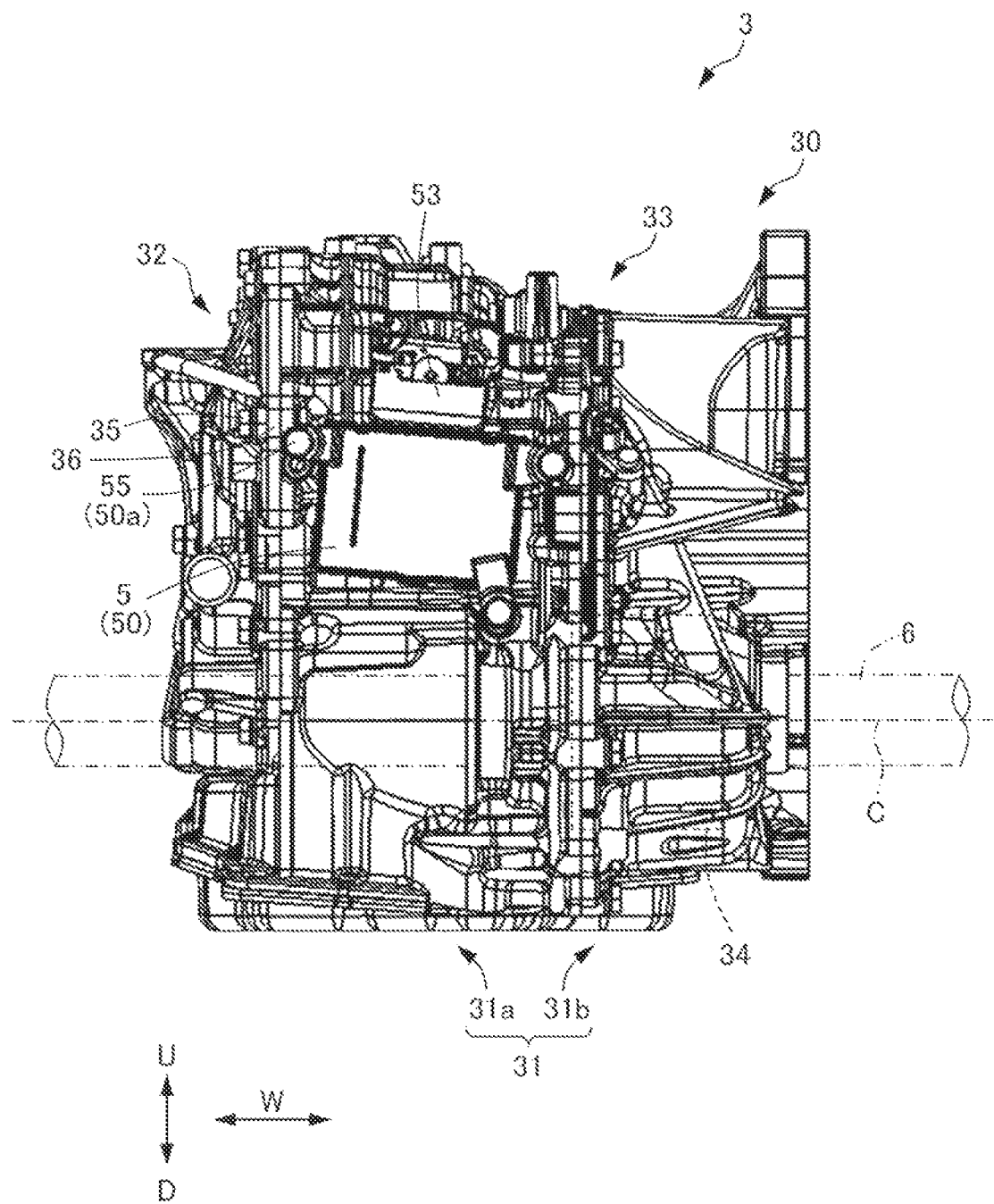
FIG. 3 is a backside view of a transmission device of the drive device for vehicles according to the first embodiment.
Figure 4A:
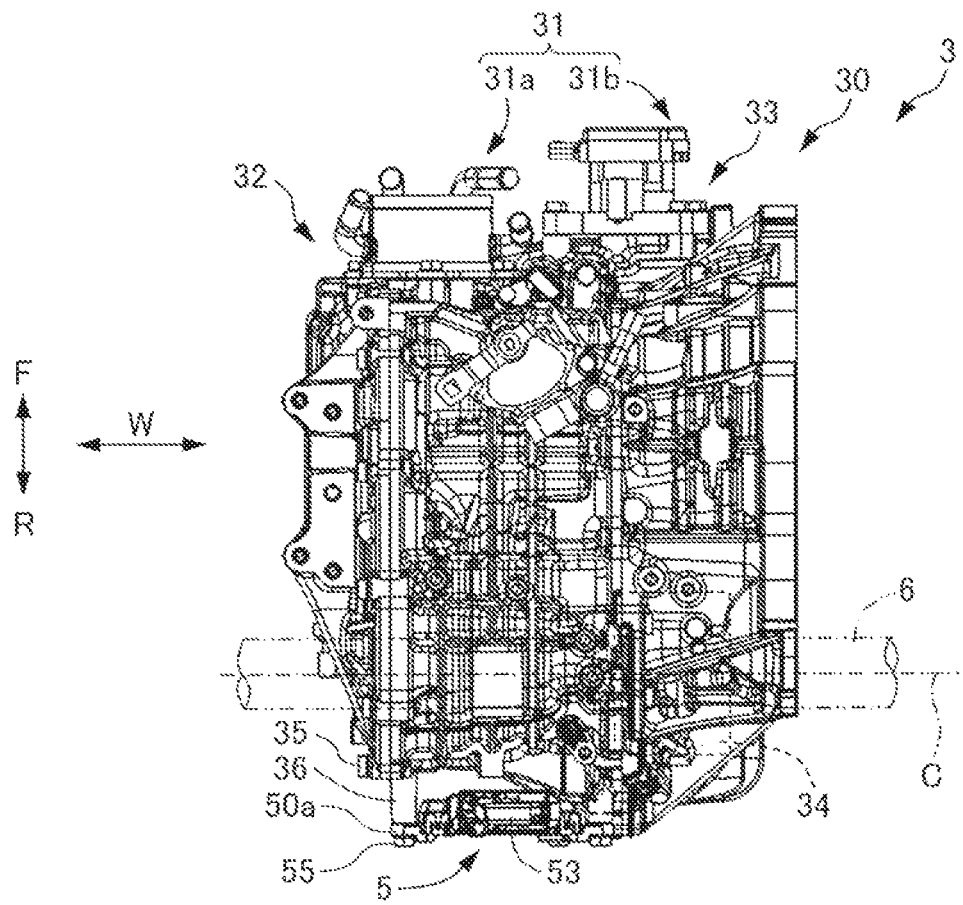
FIG. 4A is a plan view showing the transmission device of the drive device for vehicles according to the first embodiment.
Figure 4B:
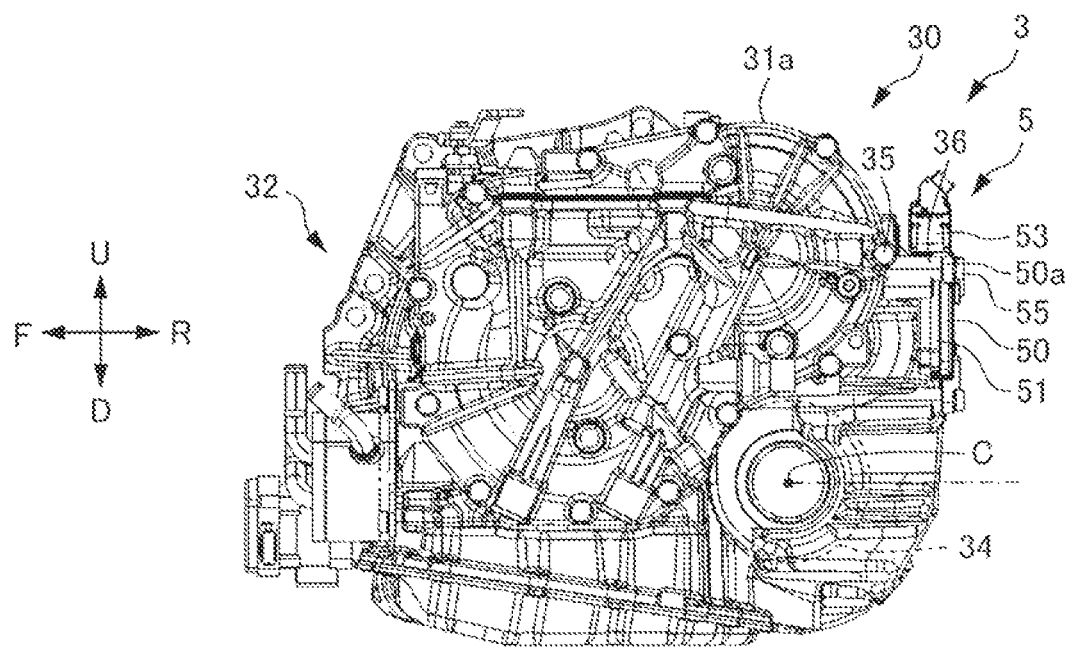
FIG. 4B is a side view showing the transmission device of the drive device for vehicles according to the first embodiment.
Figure 5:
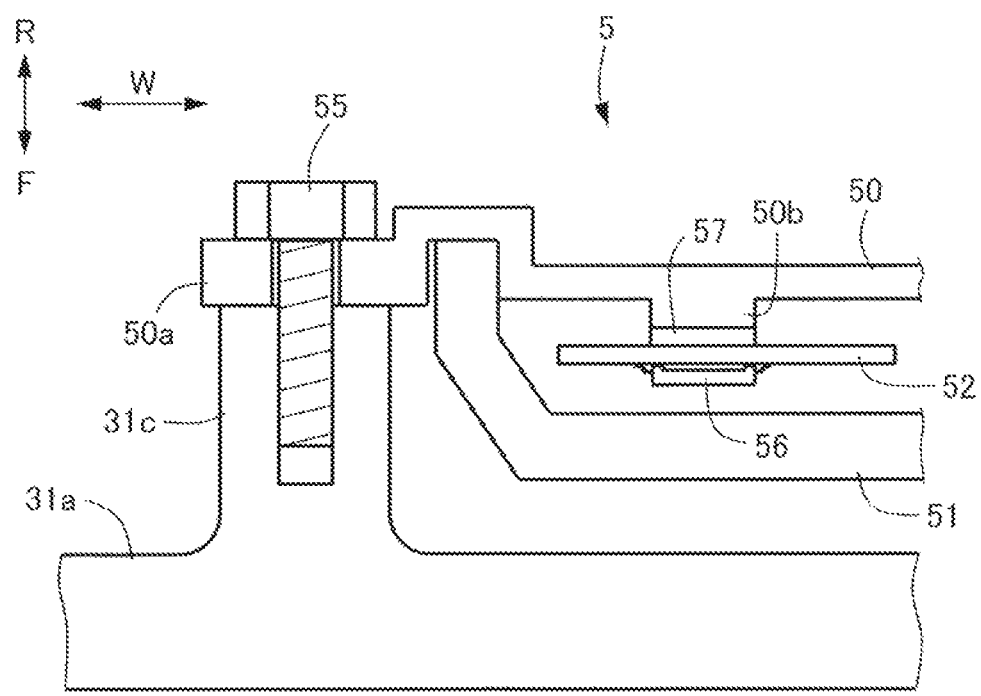
FIG. 5 is a cross-sectional view of the control device for the drive device for vehicles according to the first embodiment.

As shown in FIGS. 3 to 4B, the ECU 5 is installed at a side portion (rear side portion) in a rear direction R of the transmission device 30 in the front-rear direction of the vehicle 1, i.e., on a vehicle interior 1b side. Here, during forward traveling of the vehicle 1, heat dissipation from the radiator 8 is mainly discharged from above to the rear of the internal combustion engine 2, and heat dissipation from the internal combustion engine 2 is mainly discharged from below to the rear of the internal combustion engine 2. Hence, for example, compared to a case in which the ECU 5 is installed at a front side portion of the transmission device 30, the amount of heat received by the ECU 5 from the radiator 8, etc., can be reduced, and thus, overheating of the ECU 5 can be inhibited. In addition, compared to a case in which the ECU 5 is installed at the front side portion of the transmission device 30, it becomes difficult for bouncing rocks from a road surface to reach, and the amount of water splash onto the ECU 5 is reduced, and thus, it is preferable also in terms of the prevention of hit of bouncing rocks onto the ECU 5 and the waterproof properties of the ECU 5.

In addition, as shown in FIG. 3, the ECU 5 is disposed such that the whole ECU 5 overlaps within a contour of the transmission device 30 when the transmission device 30 is viewed from the front or rear side. Hence, upon mounting the automatic transmission 3, a reduction in mountability caused by the ECU 5 jutting out from the transmission device 30 in an up-down direction or a left-right direction does not occur. Particularly, in the present embodiment, the ECU 5 is installed on a base 31c (see FIG. 5) at a side portion in the rear direction R of the casing 31a by screwing a screw hole part 50a with a bolt 55, and the ECU 5 is disposed such that the whole ECU 5 overlaps within a contour of the casing 31a when the transmission device 30 is viewed from the front side. Hence, since an area where the ECU 5 is installed does not lie over the casing 31a and the holding case 31b, the installation accuracy of the ECU 5 can be maintained at a high level. In addition, in the present embodiment, as shown in FIGS. 4A and 4B, the ECU 5 is disposed such that at least a part of the ECU 5 overlaps within the contour of the transmission device 30 when the transmission device 30 is viewed in the left-right direction or up-down direction. Therefore, upon mounting the automatic transmission 3, compared to a case in which the whole ECU 5 juts out from the transmission device 30 in the front-rear direction, mountability can be improved. In addition, the ECU 5 is disposed at a location where at least a part of the ECU 5 overlaps the flange part 36 as viewed in an axis-of-rotation direction. Hence, a distance between the casing 31a and the ECU 5 in the front-rear direction of the vehicle 1 can be reduced, and thus, an increase in the size of the transmission device 30 can be excellently inhibited.

In addition, the ECU 5 is installed with the cover 51 facing a front direction F side (front side) and the case 50 facing a rear direction R side (rear side). Since the cover 51 made of resin faces the front side, i.e., a transmission device 30 side, compared to a case in which the cover 51 faces an opposite side to the transmission device 30, it becomes difficult for bouncing rocks to hit the cover 51, and the cover 51 which is made of resin and thus get damaged more easily than that made of metal can be protected. In addition, since the breather holes which are not shown are made in the cover 51, compared to a case in which the cover 51 faces the opposite side to the transmission device 30, it is difficult for moisture to enter from the outside.

On the other hand, since the case 50 made of metal faces the rear side, i.e., the opposite side to the transmission device 30, the case 50 is more likely to be hit with bouncing rocks than the cover 51, but since the case 50 is made of metal and has high stiffness, damage can be inhibited. In addition, since the case 50 is made of metal with high heat dissipation performance and faces the opposite side to the transmission device 30, heat dissipation of the ECU 5 can be efficiently performed. Namely, in the present embodiment, as shown in FIG. 5, the ECU 5 is installed on the casing 31a such that the cover 51 made of resin faces inward (front side) and the case 50 made of metal faces outward (rear side). By this, heat from the heating element 56 can be transferred to the case 50 through the heat-dissipating material 57 which is interposed between the control board 52 and the case 50, and dissipated into the air from an opposite side to the casing 31a. Furthermore, the heat transferred to the case 50 is transferred to the casing 31a from the case 50 through the bolt 55 and the base 31c, by which the heat dissipation performance of the ECU 5 can be improved. As such, heat of the ECU 5 can be effectively released by heat dissipation from the case 50 into the air on the opposite side to the casing 31a and by heat transfer to the casing 31a. Note that although the present embodiment describes a case in which the ECU 5 is installed only on the casing 31a, the configuration is not limited thereto, and at least a part of the ECU 5 should be installed on the outside of the casing 31a. For example, the ECU 5 may be installed so as to lie over the casing 31a and the holding case 31b.

In addition, as shown in FIGS. 3 and 4B, the ECU 5 is disposed more on an up direction U side (upper side) than a center axis C of the differential device 34. Hence, for example, water, etc., adhered onto the drive shafts 6 from a road surface can be inhibited from splashing all the way to the ECU 5. In addition, the ECU 5 is disposed along a side portion in the rear direction R, i.e., a portion of an outer surface of the transmission device 30 corresponding to an area where the ECU 5 is installed on the casing 31a. Hence, while interference with other members is avoided, a reduction in mountability caused by the ECU 5 jutting out from the transmission device 30 can be inhibited.

In addition, as shown in FIG. 1, the ECU 5 is disposed between a partition 1c that separates the engine room 1a of the vehicle 1 from the vehicle interior 1b, and the transmission device 30. Hence, by the ECU 5 mounted between the partition 1c and the transmission device 30, compared to a case in which the ECU 5 is installed at other side portions of the transmission device 30, i.e., an underside portion, a left or right side portion, or a front side portion, it becomes more difficult for bouncing rocks and water from a road surface to reach the ECU 5, and the amount of heat received from the radiator 8, etc., disposed on the front side of the vehicle 1 is further reduced. By this, hit of bouncing rocks and adhesion of water onto the ECU 5 which is installed on the outside of the transmission device 30 and overheating of the ECU 5 are inhibited, enabling to excellently secure the durability of the ECU 5.

Furthermore, as shown in FIG. 3, the ECU 5 is provided so as to be inclined in the width direction W. In the present embodiment, the ECU 5 is provided such that one end of the connector terminal 53 formed so as to extend in the axis-of-rotation direction of the transmission device 30 is lower than the other end. Namely, a top side of the ECU 5 from which the connector terminal 53 protrudes is inclined relative to a horizontal direction which is the width direction W. By this, for example, water can be prevented from building up on the top side of the ECU 5, enabling to inhibit a short circuit and the promotion of corrosion which are caused by water staying around the connector terminal 53 for a long period of time. In addition, although in the present embodiment the top side of the ECU 5 is inclined, the configuration is not limited thereto, and for example, the top side of the ECU 5 may be horizontal and a top side of the connector terminal 53 may be inclined. In addition, for example, when the connector terminal 53 is provided so as to protrude from a side or front/rear side of the ECU 5 in the up direction U, too, the top side of the ECU 5 may be horizontal and the top side of the connector terminal 53 may be inclined.

Next, action of the above-described automatic transmission 3 taken during vehicle travel will be described. After some time of traveling of the vehicle 1, the temperature of heat dissipation from the radiator 8 increases. Accordingly, heat from the radiator 8 and the internal combustion engine 2 starts to flow rearward. At this time, heat dissipation from the radiator 8 is mainly discharged from above to the rear of the internal combustion engine 2, and heat dissipation from the internal combustion engine 2 is mainly discharged from below to the rear of the internal combustion engine 2. Here, the ECU 5 is provided on a rear side of the transmission device 30, and thus, compared to a case in which the ECU 5 is installed at the front side portion of the transmission device 30, the amount of heat received by the ECU 5 can be reduced, and thus, overheating of the ECU 5 can be inhibited.

As described above, according to the automatic transmission 3 of the present embodiment, since the ECU 5 is installed at the rear side portion of the transmission device 30 in the front-rear direction of the vehicle 1, compared to a case in which the ECU 5 is installed at a side portion of the underside of the transmission device 30 or at a side portion in the left-right direction of the transmission device 30, it becomes difficult for bouncing rocks and water from a road surface to reach the ECU 5, and a location where the ECU 5 is mounted is on the vehicle interior 1b side, and thus, the amount of heat received from the radiator 8, etc., disposed on the front side of the vehicle 1 is further reduced. By this, hit of bouncing rocks and adhesion of water onto the ECU 5 which is installed on the outside of the transmission device 30 and overheating of the ECU 5 are inhibited, enabling to excellently secure the durability of the ECU 5.

In addition, in the automatic transmission 3 of the present embodiment, the ECU 5 is disposed such that the whole ECU 5 overlaps within the contour of the transmission device 30 when the transmission device 30 is viewed from the front or rear side. Hence, upon mounting the automatic transmission 3 on the vehicle 1, a reduction in mountability caused by the ECU 5 jutting out from the transmission device 30 in the up-down direction or left-right direction can be inhibited. Particularly, in the present embodiment, the ECU 5 is installed at a side portion in the rear direction R of the casing 31a by screwing the screw hole parts 50a, and the ECU 5 is disposed such that the whole ECU 5 overlaps within the contour of the casing 31a when the transmission device 30 is viewed from the front side. Hence, since the area where the ECU 5 is installed does not lie over the casing 31a and the holding case 31b, the installation accuracy of the ECU 5 can be maintained at a high level. In addition, a connector (not shown) on a transmission device 30 side that is connected to the connector terminal 53 of the ECU 5 through a cable 10 is formed in the casing 31a, and thus, compared to a case in which the connector on the transmission device 30 side is formed in the holding case 31b, routing of the cable 10 can be facilitated.

In addition, in the automatic transmission 3 of the present embodiment, the ECU 5 is disposed more on the up direction U side (upper side) than the center axis C of the differential device 34. Hence, for example, water, etc., adhered onto the drive shafts 6 from a road surface can be inhibited from splashing all the way to the ECU 5.

In addition, in the automatic transmission 3 of the present embodiment, the ECU 5 is installed with the cover 51 facing the front side and the case 50 facing the rear side. Since the cover 51 made of resin faces the transmission device 30 side, compared to a case in which the cover 51 faces the opposite side to the transmission device 30, it becomes difficult for bouncing rocks to hit the cover 51, and the cover 51 which is made of resin and thus get damaged more easily than that made of metal can be protected. In addition, since the breather holes which are not shown are made in the cover 51, compared to a case in which the cover 51 faces the opposite side to the transmission device 30, the entry of moisture from the outside can be made difficult. On the other hand, since the case 50 made of metal faces the opposite side to the transmission device 30, the case 50 is more likely to be hit with bouncing rocks than the cover 51, but since the case 50 is made of metal and has high stiffness, damage can be inhibited. In addition, since the case 50 is made of metal with high heat dissipation performance and faces the opposite side to the transmission device 30, heat dissipation of the ECU 5 can be efficiently performed.

In addition, in the automatic transmission 3 of the present embodiment, the top side of the ECU 5 from which the connector terminal 53 protrudes is inclined relative to the horizontal direction which is the width direction W. By this, for example, water can be prevented from building up on the top side of the ECU 5, enabling to inhibit a short circuit and the promotion of corrosion which are caused by water staying around the connector terminal 53 for a long period of time.

Second Embodiment

Next, a second embodiment of a drive device for vehicles will be described with reference to FIG. 6. The present embodiment differs from the first embodiment in a configuration in which the ECU 5 is installed at a front side portion of the transmission device 30 in the front-rear direction of the vehicle 1. Note, however, that other configurations are the same as those of the first embodiment and thus the same reference signs are used and a detailed description thereof is omitted.

Figure 6:
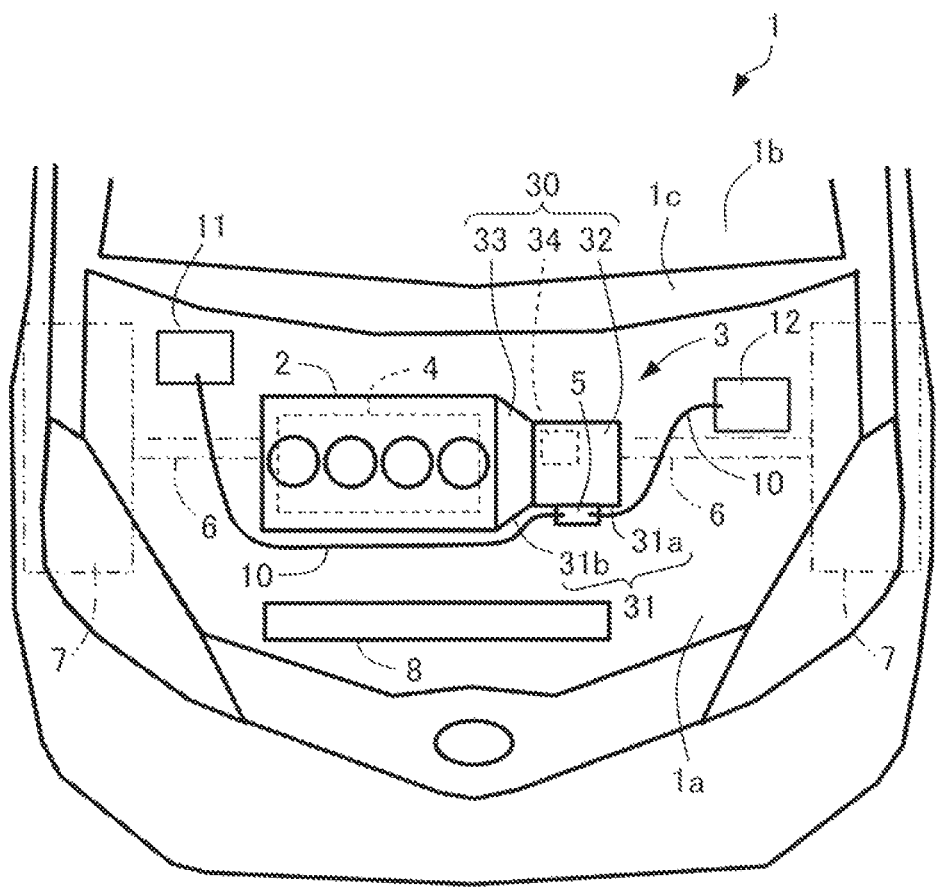
FIG. 6 is a schematic diagram showing a vehicle on which a drive device for vehicles according to a second embodiment is mounted.

In the present embodiment, as shown in FIG. 6, the ECU 5 is installed at a side portion (front side portion) in the front direction F of the transmission device 30 in the front-rear direction of the vehicle 1, i.e., on a radiator 8 side. In this case, too, the ECU 5 is disposed such that the whole ECU 5 overlaps within the contour of the transmission device 30 when the transmission device 30 is viewed from the front or rear side. Hence, upon mounting the automatic transmission 3, a reduction in mountability caused by the ECU 5 jutting out from the transmission device 30 in the up-down direction or left-right direction does not occur.

In addition, in the present embodiment, too, as shown in FIG. 5, the ECU 5 is installed on the casing 31a such that the cover 51 made of resin faces inward (rear side) and the case 50 made of metal faces outward (front side). The ECU 5 is installed with the cover 51 facing the rear side and the case 50 facing the front side. Since the cover 51 made of resin faces the rear side, i.e., the transmission device 30 side, compared to a case in which the cover 51 faces the opposite side to the transmission device 30, it becomes difficult for bouncing rocks to hit the cover 51, and the cover 51 which is made of resin and thus get damaged more easily than that made of metal can be protected. In addition, since the case 50 made of metal faces the front side, i.e., the opposite side to the transmission device 30, the case 50 is more likely to be hit with bouncing rocks than the cover 51, but since the case 50 is made of metal and has high stiffness, damage can be inhibited. In addition, since the case 50 is made of metal with high heat dissipation performance and faces the opposite side to the transmission device 30, heat dissipation of the ECU 5 can be efficiently performed. Namely, heat from the heating element 56 can be effectively released by heat dissipation from the case 50 into the air on the opposite side to the casing 31a and heat transfer to the casing 31a.

In addition, as shown in FIG. 6, the ECU 5 is disposed between the radiator 8 and the transmission device 30. Hence, by the ECU 5 mounted between the radiator 8 and the transmission device 30, compared to a case in which the ECU 5 is installed at other side portions of the transmission device 30, it becomes more difficult for bouncing rocks and water from a road surface to reach the ECU 5.

As described above, by the automatic transmission 3 of the present embodiment, too, since the ECU 5 is installed at the front side portion of the transmission device 30 in the front-rear direction of the vehicle 1, compared to a case in which the ECU 5 is installed at a side portion of the underside of the transmission device 30 or at a side portion in the left-right direction of the transmission device 30, it becomes difficult for bouncing rocks and water from a road surface to reach the ECU 5. By this, hit of bouncing rocks and adhesion of water onto the ECU 5 which is installed on the outside of the transmission device 30 and overheating of the ECU 5 are inhibited, enabling to excellently secure the durability of the ECU 5.

Note that the above-described first and second embodiments have at least the following configuration. Drive devices for vehicles (3) of the respective embodiments include a transmission device (30) including a transmission mechanism (32) that changes a speed of inputted rotation of a drive source (2) of a vehicle (1) and outputs the rotation and that is provided on an axis of rotation orthogonal to a front-rear direction of the vehicle (1); and a casing (31a) that holds the transmission mechanism (32); and a control device (5) that performs electronic control of the transmission device (30), at least a part of the control device (5) being installed on an outside of the casing (31a), and the control device (5) is installed at either one of a front side portion and a rear side portion of the casing (31a) in the front-rear direction of the vehicle (1). According to this configuration, the control device (5) is installed at either one of the front side portion and rear side portion of the casing (31a) in the front-rear direction of the vehicle (1), and thus, for example, compared to a case in which the control device (5) is installed at an underside portion of the casing (31a), it becomes difficult for bouncing rocks and water from a road surface to reach the control device (5). Furthermore, when the control device (5) is installed at the front side portion, the amount of wind blowing onto the control device (5) from the front of the vehicle (1) increases, enabling to excellently cool the control device (5), or when the control device (5) is installed at the rear side portion, a location where the control device (5) is installed is on a vehicle interior (1b) side, and thus, the amount of heat received from a radiator (8), etc., disposed on a vehicle's front side is further reduced. By this, hit of bouncing rocks and adhesion of water onto the control device (5) which is installed on the outside of the transmission device (30) and overheating of the control device (5) are inhibited, enabling to excellently secure the durability of the control device (5).

In addition, in a first drive device for vehicles (3), the control device (5) is installed at the rear side portion of the casing (31a) in the front-rear direction of the vehicle (1). According to this configuration, the control device (5) is installed at the rear side portion of the transmission device (30) in the front-rear direction of the vehicle (1), and thus, for example, compared to a case in which the control device (5) is installed at an underside portion of the casing (31a), it becomes difficult for bouncing rocks and water from a road surface to reach the control device (5), and a location where the control device (5) is mounted is on the vehicle interior (1b) side, and thus, the amount of heat received from the radiator (8), etc., disposed on the vehicle's front side is further reduced. By this, hit of bouncing rocks and adhesion of water onto the control device (5) which is installed on the outside of the transmission device (30) and overheating of the control device (5) are inhibited, enabling to excellently secure the durability of the control device (5).

In addition, in the drive devices for vehicles (3) of the first and second embodiments, the control device (5) is disposed such that the whole control device (5) overlaps within a contour of the transmission device (30) when the transmission device (30) is viewed from a front side. According to this configuration, upon mounting the drive device for vehicles (3) on the vehicle (1), a reduction in mountability caused by the control device (5) jutting out from the transmission device (30) in an up-down direction or a left-right direction can be inhibited.

In addition, in the drive devices for vehicles (3) of the first and second embodiments, the transmission device (30) includes a differential device (34) that can absorb a rotational speed difference between left and right axles (6) of the vehicle (1), and the control device (5) is disposed on a more upper side than a center axis (C) of the differential device (34). According to this configuration, for example, water, etc., adhered onto the axles (6) from a road surface can be inhibited from splashing all the way to the control device (5).

In addition, in the drive devices for vehicles (3) of the first and second embodiments, the control device (5) is disposed along a portion of an outer surface corresponding to an area where the control device (5) is installed on the casing (31a). According to this configuration, while interference with other members is avoided, a reduction in mountability caused by the control device (5) jutting out from the transmission device (30) can be inhibited.

In addition, in the drive device for vehicles (3) of the first embodiment, the control device (5) is disposed between a partition (1c) and the transmission device (30), the partition (1c) separating an engine room (1a) of the vehicle (1) from a vehicle interior (1b). According to this configuration, by the control device (5) mounted between the partition (1c) that separates the engine room (1a) from the vehicle interior (1b) and the transmission device (30), compared to a case in which the control device (5) is installed at other side portions of the transmission device (30), it becomes more difficult for bouncing rocks and water from a road surface to reach the control device (5), and the amount of heat received from the radiator (8), etc., disposed on the front side of the vehicle (1) is further reduced. By this, hit of bouncing rocks and adhesion of water onto the control device (5) which is installed on the outside of the transmission device (30) and overheating of the control device (5) are inhibited, enabling to excellently secure the durability of the control device (5).

In addition, in the drive devices for vehicles (3) of the first and second embodiments, the control device (5) includes a control board (52), a case (50) made of metal, and a cover (51) made of resin that is placed on one side of the case (50) and holds the control board (52) with the case (50), and is installed on the transmission device (30) with the cover (51) facing a transmission device (30) side and the case (50) facing an opposite side to the transmission device (30). According to this configuration, since the cover (51) made of resin faces the transmission device (30) side, compared to a case in which the cover (51) faces the opposite side to the transmission device (30), it becomes difficult for bouncing rocks to hit the cover (51), and the cover (51) which is made of resin and thus get damaged more easily than that made of metal can be protected. On the other hand, since the case (50) made of metal faces the opposite side to the transmission device (30), the case (50) is more likely to be hit with bouncing rocks than the cover (51), but since the case (50) is made of metal and has high stiffness, damage can be inhibited. In addition, since the case (50) is made of metal with high heat dissipation performance and faces the opposite side to the transmission device (30), heat dissipation of the control device (5) can be efficiently performed.

In addition, in the drive devices for vehicles (3) of the first and second embodiments, the control device (5) includes a heating element (56) mounted on the control board (52); and a heat-dissipating material (57) interposed between the control board (52) and the case (50), and the heat-dissipating material (57) is located on an opposite side of the control board (52) from the heating element (56). According to this configuration, since the heat-dissipating material (57) is interposed between the case (50) made of metal and the control board (52), heat from the heating element (56) is directly transferred to the case (50) made of metal through the heat-dissipating material (57). In addition, since the case (50) made of metal is installed so as to face outward relative to the casing (31a) of the transmission mechanism (32), compared to a case in which the case (50) made of metal is installed so as to face inward, a distance between the case (50) made of metal and the casing (31a) increases, and thus, the amount of heat received by the case (50) made of metal from the casing (31a) can be further reduced. Therefore, by transferring heat of the heating element (56) from the case (50) made of metal to the casing (31a) through a bolt (55) and a base (31c) of the control device (5), the heat of the heating element (56) can be excellently dissipated.

In addition, in the drive devices for vehicles (3) of the first and second embodiments, the transmission device (30) includes a hydraulic power transmission mechanism (33) and a holding case (31b) that holds the hydraulic power transmission mechanism (33), and the whole control device (5) is installed on an outside of the casing (31a). According to this configuration, since an area where the control device (5) is installed does not lie over the casing (31a) and the holding case (31b), the installation accuracy of the control device (5) can be maintained at a high level.

In addition, in the drive devices for vehicles (3) of the first and second embodiments, the casing (31a) includes a flange part (36) for fastening the casing (31a) to the holding case (31b) with a fastening member (35), the flange part (36) extending in a radial direction, and the control device (5) is disposed at a location where at least a part of the control device (5) overlaps the flange part (36) as viewed in an axis-of-rotation direction. According to this configuration, a distance between the casing (31a) and the control device (5) in the front-rear direction of the vehicle (1) can be reduced, and thus, an increase in the size of the transmission device (30) can be excellently inhibited.

In addition, in the drive devices for vehicles (3) of the first and second embodiments, the control device (5) includes a connector terminal (53) for establishing an electrical connection with a control device (12) for the vehicle (1) or a control device (11) for the drive source (2), the connector terminal (53) being provided so as to protrude from the control device (5) in an outward up direction (U). According to this configuration, upon placing a cable on the connector terminal (53), work can be done from the upper side, enabling to improve workability.

In addition, in the drive devices for vehicles (3) of the first and second embodiments, the control device (5) is disposed such that one end of the connector terminal (53) is lower than another end, the connector terminal (53) being formed so as to extend in an axis-of-rotation direction of the transmission device (30). According to this configuration, water can be prevented from building up on a top side of the connector terminal (53), enabling to inhibit a short circuit and the promotion of corrosion which are caused by water staying on the connector terminal (53) for a long period of time.

INDUSTRIAL APPLICABILITY

A drive device for vehicles according to the present disclosure can be mounted on, for example, vehicles and is particularly suitable for use as an automatic transmission including a control device which is installed on an outside of a transmission device.

The present invention is not limited to the above-described embodiments, and various changes and modifications can be made without departing from the spirit and scope of the present invention.

The invention claimed is:
1. A drive device for vehicles comprising:
a transmission device including a transmission mechanism that changes a speed of inputted rotation of a drive source of a vehicle and outputs the rotation and that is provided on an axis of rotation orthogonal to a front-rear direction of the vehicle; and a casing that holds the transmission mechanism; and a control device that performs electronic control of the transmission device, at least a part of the control device being installed on an outside of the casing, wherein the control device is installed at either one of a front side portion and a rear side portion of the casing in the front-rear direction of the vehicle, the control device includes a connector terminal for establishing an electrical connection with a control device for the vehicle or a control device for the drive source, and the control device is disposed such that one end of the connector terminal is lower than another end, the connector terminal being formed so as to extend in an axis-of-rotation direction of a drive shaft extending from the transmission device.

2. The drive device for vehicles according to claim 1, wherein the control device is installed at the rear side portion of the casing in the front-rear direction of the vehicle.

3. The drive device for vehicles according to claim 1, wherein the control device is disposed such that the whole control device overlaps within a contour of the transmission device when the transmission device is viewed from a front side.

4. The drive device for vehicles according to claim 1, wherein the control device is disposed along a portion of an outer surface of the casing.

5. The drive device for vehicles according to claim 1, wherein the control device is disposed between a partition and the transmission device, the partition separating an engine room of the vehicle from a vehicle interior.

6. The drive device for vehicles according to claim 1, wherein the control device:

includes a control board, a case made of metal, and a cover made of resin that is placed on one side of the case and holds the control board with the case; and is installed on the transmission device with the cover facing a transmission device side and the case facing an opposite side to the transmission device.

7. The drive device for vehicles according to claim 1, wherein the transmission device includes a hydraulic power transmission mechanism and a holding case that holds the hydraulic power transmission mechanism, and the whole control device is installed on the outside of the casing.

8. The drive device for vehicles according to claim 1, the connector terminal being provided so as to protrude from the control device in an outward up direction.

9. A drive device for vehicles comprising:

a transmission device including a transmission mechanism that changes a speed of inputted rotation of a drive source of a vehicle and outputs the rotation and that is provided on an axis of rotation orthogonal to a front-rear direction of the vehicle; and a casing that holds the transmission mechanism; and a control device that performs electronic control of the transmission device, at least a part of the control device being installed on an outside of the casing, wherein the control device is installed at either one of a front side portion and a rear side portion of the casing in the front-rear direction of the vehicle, the transmission device includes a differential device that can absorb a rotational speed difference between left and right axles of the vehicle, and the control device is disposed on a more upper side than a center axis of the differential device.

10. A drive device for vehicles comprising:

a transmission device including a transmission mechanism that changes a speed of inputted rotation of a drive source of a vehicle and outputs the rotation and that is provided on an axis of rotation orthogonal to a front-rear direction of the vehicle; and a casing that holds the transmission mechanism; and a control device that performs electronic control of the transmission device, at least a part of the control device being installed on an outside of the casing, wherein the control device is installed at either one of a front side portion and a rear side portion of the casing in the front-rear direction of the vehicle; and the control device:

includes a control board, a case made of metal, and a cover made of resin that is placed on one side of the case and holds the control board with the case, is installed on the transmission device with the cover facing a transmission device side and the case facing an opposite side to the transmission device, includes a heating element mounted on the control board; and a heat-dissipating material interposed between the control board and the case, and the heat-dissipating material is located on an opposite side of the control board from the heating element.

11. A drive device for vehicles comprising a transmission device including a transmission mechanism that changes a speed of inputted rotation of a drive source of a vehicle and outputs the rotation and that is provided on an axis of rotation orthogonal to a front-rear direction of the vehicle; and a casing that holds the transmission mechanism; and a control device that performs electronic control of the transmission device, at least a part of the control device being installed on an outside of the casing, wherein the control device is installed at either one of a front side portion and a rear side portion of the casing in the front-rear direction of the vehicle, the transmission device includes a hydraulic power transmission mechanism and a holding case that holds the hydraulic power transmission mechanism, the whole control device is installed on the outside of the casing the casing includes a flange part for fastening the casing to the holding case with a fastening member, the flange part extending in a radial direction, and the control device is disposed at a location where at least a part of the control device overlaps the flange part as viewed in an axis-of-rotation direction.

* * * * *